May 20, 1952   C. K. STILLWAGON   2,597,829
PISTON
Filed Jan. 27, 1947

Inventor
Crawford K. Stillwagon.
By
E. V. Hardway,
Attorney

Patented May 20, 1952

2,597,829

UNITED STATES PATENT OFFICE 2,597,829

PISTON

Crawford K. Stillwagon, Houston, Tex.

Application January 27, 1947, Serial No. 724,618

1 Claim. (Cl. 309—4)

This invention relates to a piston.

An object of the invention is to provide a novel type of piston specially designed for use in high pressure pumps such as slush pumps and other types of pumps which are required to deliver heavy liquids under high pressure.

Another object of the invention is to provide a pump piston having a novel type of sectional hub with a central radial separator plate thereon and with packing rings, of novel formation around the hub in abutting relation with said plate.

Another object of the present invention is to provide a piston of the character described wherein the packing rings are maintained assembled with the hub in a novel manner.

The invention also embodies a novel type of packing ring whose forward end is so shaped that it will form a fluid tight seal with the surrounding cylinder as well as with the hub when the ring is subjected to the pressure of the liquid being pumped.

A still further object of the invention is to provide a pump piston of the character described whose parts are interchangeable.

The invention also embodies means for causing the packing rings to engage the central plate to prevent radial movement of the rings relative to the plate.

Figure 1:
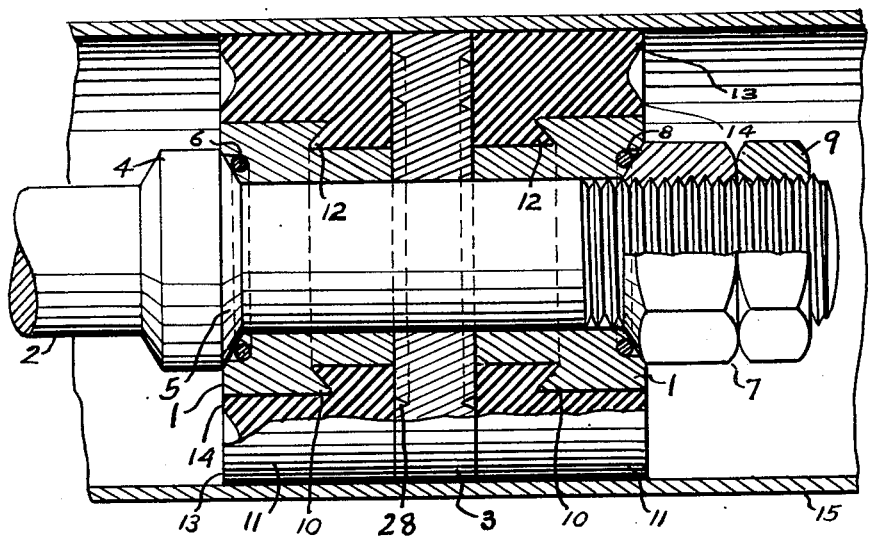
Figure 2:
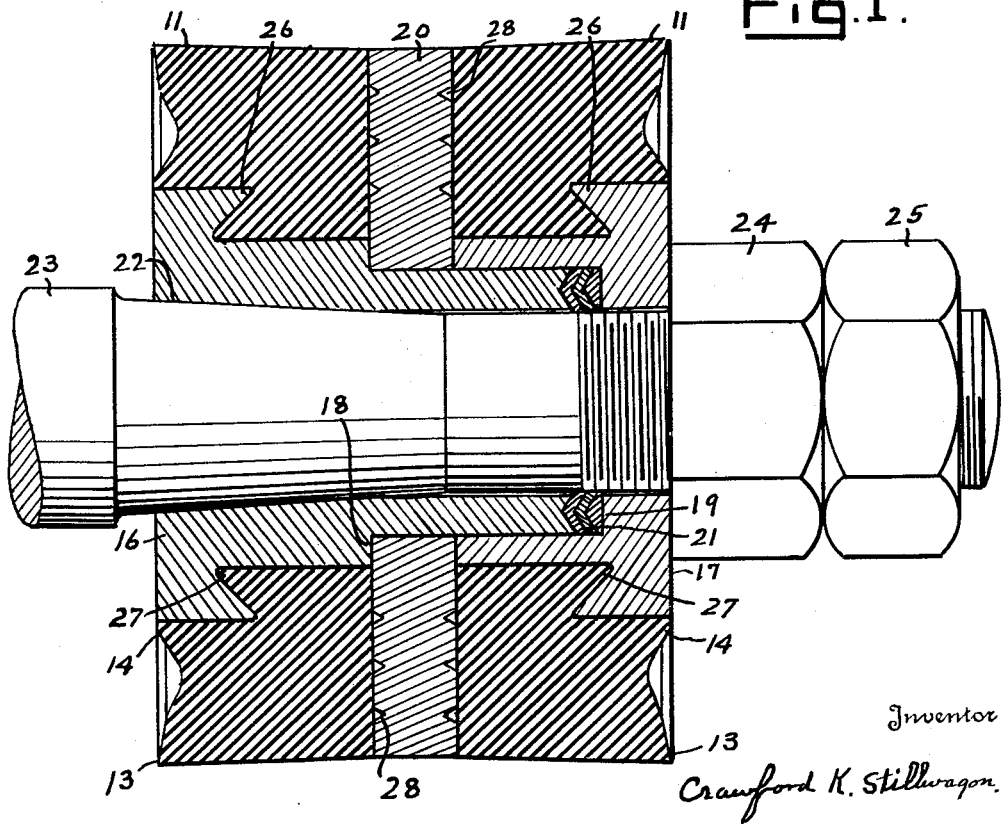

With the above and other objects in view the invention has particular relation to certain novel features of construction, operation and arrangement of parts examples of which are given in this specification and illustrated in the accompanying drawings wherein:

Figure 1 is a side view of the piston, partly in section and shown within a pump liner which is also shown in section, and Figure 2 is a sectional view of another embodiment of the invention.

Referring now more particularly to the drawings wherein like numerals of reference designate the same parts in each of the figures, the numerals 1, 1 designate complementary hub sections which are fitted around the cylindrical end of the piston rod 2 and whose inner ends abut a separator plate 3 which is fitted closely over said end of the piston rod 2.

This rod may be formed with an annular rib 4 therearound which is spaced from the free end thereof and whose side, adjacent the piston, is provided with an annular tapering face 5.

The outer end of the adjacent hub section 1 is flared to conform to the taper of the face 5 so as to fit thereagainst and this flared portion may be provided with an annular groove to receive a packing such as an O-ring 6 which will form a fluid tight joint.

As hereinbefore stated the hub sections 1, 1 are identical and may be interchanged.

The piston is maintained on the piston rod by means of a clamp nut 7 which may be screwed onto the free end of the piston rod and whose inner end is formed with a tapering face to conform to the taper of and to fit against the outer flared end of the adjacent hub section 1 which may also be provided with a packing ring such as an O-ring 8 seated in an annular groove in said adjacent end.

The nut 7 may be maintained in place against unscrewing by means of a lock nut 9 screwed onto the free end of the piston rod 2.

The inner ends of the hub sections 1, 1 are reduced in external diameter and undercut thus forming the overhanging annular shoulders 10, 10 which converge outwardly toward each other.

Surrounding the hub sections 1, 1 are similar, interchangeable packing sections 11, 11 which are formed of resilient material such as rubber or other suitable material.

The inner sides of these packing rings 11 are shaped to conform to the external contour of the hub sections and fit closely therearound and are of substantially the same length as the length of the hub sections. They are therefore formed with the inside annular overhanging shoulders 12, 12 which diverge outwardly and interlock with the shoulders 10, 10 of the hub sections.

The inner ends of the packing sections 11, 11 abut against the adjacent faces of the separator plate 3.

The outer, or forward, ends of the packing rings have relatively shallow annular grooves therearound forming the outer annular lips 13, 13 and the inner annular lips 14, 14. The liquid under pressure in front of these lips will cause the lips 13 to form seals with the pump liner 15, in which the piston is working and the inner lips 14 will form seals with the corresponding hub sections 1. This will prevent leakage of the fluid, which is often gritty, and will minimize the cutting away of parts by said gritty liquid.

In the form illustrated in Figure 2 there are the hub sections 16 and 17. The inner end of the section 16 is reduced in external diameter forming the external annular shoulder 18 and the inner end of the section 17 is enlarged in internal diameter forming the internal annular shoulder 19. The inner end of the section 16 telescopes into the enlarged inner end of the section 17. In this embodiment of the piston there is an annular separator plate 20 which is fitted over the reduced inner end of the section 16 and which is clamped between the shoulder 18 and the inner end of the hub section 17.

Between the inner end of the hub section 16 and the shoulder 19 there is a suitable packing 21 of any selected design.

In the embodiment illustrated in Figure 2 the piston rod bearing 22 in the hub section 16 is outwardly flared and the portion of the piston rod 23 which fits into said bearing is correspondingly tapered. This type of piston is maintained in assembled relation on the piston rod by means of a clamp nut 24 which is screwed onto the free end of this piston rod and clamps against the piston assembly and is locked against unscrewing by the lock nut 25 which is screwed onto said end of the piston rod into abutting relation with the clamp nut 24.

The hub sections 16 and 17 have the external, annular overhanging shoulders 26, 26 which are similar to the shoulders 10 of the form shown in Figure 1 and which converge outwardly and the packing rings 11, 11 of this form are in all respects similar to those shown in Figure 1 and are provided with the internal annular overhanging shoulders 27, 27 which interlock with the shoulders 26 of the hub. In other respects the rings 11 of Figure 2 are identical with those shown in Figure 1.

In both forms of the piston the end faces of the separator rings may be provided with annular grooves, as 28, therearound and upon application of pressure to a ring 11 the material of said ring will flow into said grooves to cause the abutting ends of the rings to engage the separator plate to prevent radial movement of said ends.

The separator plates may be formed of any selected rigid material which is somewhat softer than the material of the cylinder liner 15 so that said plates will not score said liner during the reciprocation of the piston.

The drawings and description are illustrative merely while the broad principle of the invention will be defined by the appended claim.

What I claim is:

A piston comprising, an annular separator plate having a plurality of annular end grooves spaced apart in its end faces, hub sections on opposite sides of, and abutting, said plate and having external, annular, overhanging shoulders, similar, interchangeable resilient packing rings around said respective hub sections and whose inner ends are formed with plane faces which abut said plate, said packing rings having internal, annular, overhanging shoulders which interlock with the hub shoulders.

CRAWFORD K. STILLWAGON.

REFERENCES CITED

The following references are of record in the file of this patent:

UNITED STATES PATENTS

| Number | Name | Date |
|---|---|---|
| 1,612,038 | Miller | Dec. 28, 1926 |
| 1,757,271 | Surber | May 6, 1930 |
| 1,820,228 | Kibele | Aug. 25, 1931 |
| 1,945,152 | Marsh | Jan. 30, 1934 |
| 1,974,362 | Marsh | Sept. 18, 1934 |
| 2,063,724 | Cater | Dec. 8, 1936 |
| 2,267,882 | Wilson | Dec. 30, 1941 |
| 2,417,887 | Schmidt | Mar. 25, 1947 |